(12) United States Patent
Thatcher et al.

(10) Patent No.: US 7,028,456 B2
(45) Date of Patent: Apr. 18, 2006

(54) MOWER WITH FLIP UP MOWING DECK

(75) Inventors: Stephen Thatcher, Humeston, IA (US); Scott A. Shick, Corydon, IA (US)

(73) Assignee: Shivvers Group, Inc., Corydon, IA (US)

( * ) Notice: Subject to any disclaimer, the term of this patent is extended or adjusted under 35 U.S.C. 154(b) by 0 days.

(21) Appl. No.: 10/619,017

(22) Filed: Jul. 14, 2003

(65) Prior Publication Data
US 2005/0016143 A1     Jan. 27, 2005

(51) Int. Cl.
A01D 34/03    (2006.01)
A01D 34/43    (2006.01)
A01D 34/64    (2006.01)

(52) U.S. Cl. .................................... 56/15.6; 56/15.9
(58) Field of Classification Search ............... 56/15.6, 56/15.8, DIG. 14, 15.7, 16.3, DIG. 22, 15.9
See application file for complete search history.

(56) References Cited

U.S. PATENT DOCUMENTS

| | | | |
|---|---|---|---|
| 3,874,150 A | 4/1975 | Boeck | |
| 4,779,406 A | 10/1988 | Schroeder | |
| 4,869,057 A * | 9/1989 | Siegrist ..................... | 56/15.9 |
| 5,025,617 A * | 6/1991 | Kuhn et al. .................. | 56/15.6 |
| 5,079,907 A | 1/1992 | Sameshima et al. | |
| 5,154,043 A * | 10/1992 | Schemelin et al. .......... | 56/12.7 |
| 5,355,665 A | 10/1994 | Peter | |
| 5,410,865 A | 5/1995 | Kurohara et al. | |
| 5,459,984 A | 10/1995 | Reichen et al. | |
| 5,475,971 A | 12/1995 | Good et al. | |
| 5,528,889 A * | 6/1996 | Kure et al. .................. | 56/15.6 |
| 5,784,870 A | 7/1998 | Seegert et al. | |
| 5,816,033 A | 10/1998 | Busboom et al. | |
| 5,816,035 A | 10/1998 | Shick | |
| 5,915,487 A | 6/1999 | Splittstoesser et al. | |
| 5,927,055 A | 7/1999 | Ferree et al. | |
| 5,956,932 A * | 9/1999 | Schmidt ..................... | 56/15.6 |
| 6,012,274 A | 1/2000 | Eavenson et al. | |
| 6,023,921 A | 2/2000 | Burns et al. | |
| 6,293,077 B1 * | 9/2001 | Plas et al. .................... | 56/17.1 |
| 6,434,919 B1 * | 8/2002 | Schick ........................ | 56/15.9 |
| 6,470,660 B1 * | 10/2002 | Buss et al. ................... | 56/15.9 |
| 6,584,756 B1 * | 7/2003 | Buss ........................... | 56/15.6 |
| 6,658,831 B1 * | 12/2003 | Velke et al. ................. | 56/14.7 |

OTHER PUBLICATIONS

Brochure Bob-Cat® ZT 200 Series, by Ransomes Bob-Cat, no date.

(Continued)

*Primary Examiner*—Árpád Fábián Kovács
(74) *Attorney, Agent, or Firm*—John C. McMahon

(57) ABSTRACT

A mower deck assembly which essentially "flips up" or raises from a mowing configuration to an access configuration with minimal manipulation of controls and manual lifting. A deck is connected to a frame by a parallelogram suspension which includes front and rear support arms. A rear of the deck removably connects through a height adjustment mechanism that includes the hook and capture device selectively allows the rear of the deck to swing freely so that when the mower is in a non mowing configuration. The deck has mounted thereon a plurality of pulleys, including blade pulleys connected by a single drive belt and driven by a single motor. One of the pulleys is a tension pulley that can be manipulated to disengage the pulley system. The front of the suspension includes a fine height adjustment mechanism.

15 Claims, 5 Drawing Sheets

OTHER PUBLICATIONS

Brochure Country Clipper® Zero Turn Mowers, by Shivvers, Mfg., no date.
Brochure Country Clipper® Flip Up Deck, by Shivvers Mfg., no date.
Brochure Z48, by Encore, no date.
Brochure ZTR 5000 Series, by Dixon, no date.
Brochure Exmark Lazer A® HP, by Rxmark, no date.
Brochure Pro Cut Z's, by Ferris Industrires, Inc., date Jul. 1997.
Brochure ZT Max®, by F.D. Kees Manufacturing Co., date Jul. 1997.
Brochure Snapper Yard Cruiser®, by Snapper, no date.
Brochure Twister BZT Zero-Turning-Radius Riding Mower, by Bunton, Division of Jacobsen, Jul. 1997.
Brochure Great Dane® "Zero Turn Chariot", by Great Dane Power Equipment, Inc., date Jul. 1998.
Brochure PROWLER, by Encore Power Equipment, no date.
Brochure MTD Pro MNZ wide-area mower, by MTDpro.
Brochure IS® First With Independent Suspension, by Ferris Industries, no date.

* cited by examiner

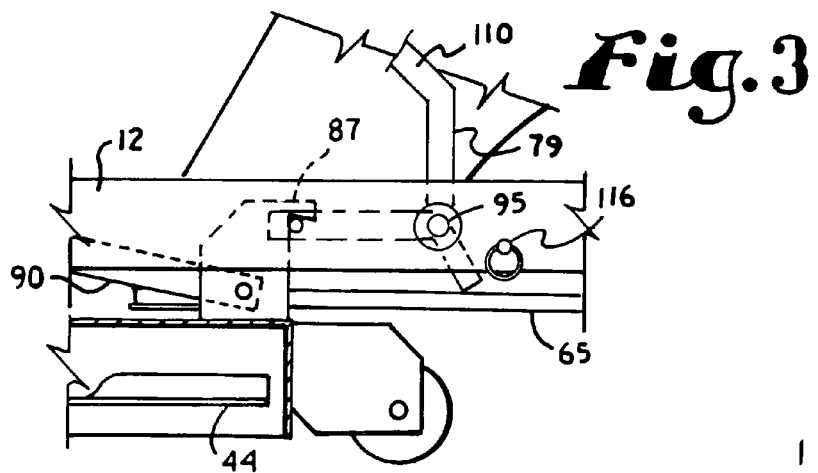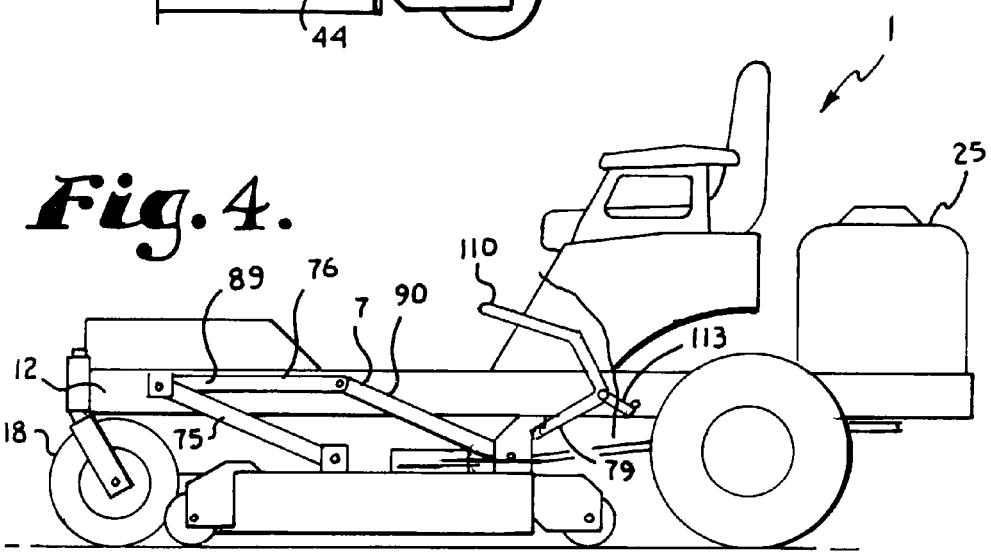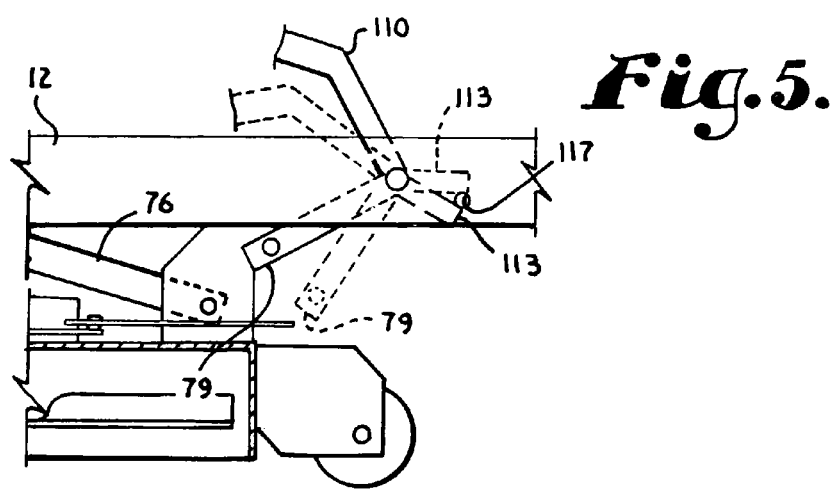

MOWER WITH FLIP UP MOWING DECK

BACKGROUND OF THE INVENTION

The present invention relates to a riding lawn mower and more particularly to a midmount riding lawn mower having a mower deck that is swingable from a mowing configuration to an access configuration having a height adjustment mechanism that easily captures the mower deck for mowing and releases the deck for access and a pair of arms which form a parallelogram when the deck is in the mowing configuration and extend outwardly in the access configuration.

Prior mowers have included a mower deck that is mounted such that the deck can tilt or rotate to a position conducive for maintenance of the deck's under housing (e.g. cleaning, replacing blades, etc). Typically, decks of this type have been described as "tiltable" or "tilting" such as in the Sameshima U.S. Pat. No. 5,079,907 and Shroeder U.S. Pat. No. 4,779,406 respectively. Prior art structures have been complicated, hard to operate, expensive to manufacture and/or present other problems both in use in mowing and in trying to convert between a mowing configuration and an access configuration.

The present invention is especially useful in conjunction with a midmount mower wherein the mower deck is mounted between the front and rear wheels of the device. In such a device, it is desirable to make conversion between the mowing configuration and the access configuration easy and quick. Nevertheless, it is also necessary to provide a support structure for the deck that maintains the deck level during mowing and allows for easy cutting height adjustment. It is also desirable to provide such a device that utilizes a single drive belt that can be easily removed to allow for conversion. Also, a simple to use level adjustment mechanism is desirable to allow for fine adjustment of deck level that is required to correct for damage, tolerance variation or to modify the deck to be slightly non parallel to the ground in accordance with the desires of the operator.

SUMMARY OF THE INVENTION

The present invention is directed to a midmount riding mower having improved mechanism for allowing a mowing deck thereof to be easily moved between a mowing configuration and an access configuration wherein an underside of the mower deck is exposed for repair or maintenance.

The mower includes a support structure for maintaining the mower deck so the blades cut in planes that are generally horizontal relative to the ground. The support structure includes a pair of laterally spaced front legs and a pair of laterally spaced rear legs. The front and rear legs are pivotally connected to a frame of the mower at the same location. The rear legs are medially hinged having an upper portion that abuts the frame along the length thereof during mowing such that the front and rear legs along with a portion of the mower deck between pivotal attachments of the front and rear legs with the mower deck generally form an adjustable support parallelogram to maintain the cutting blades so as to cut generally horizontal to the ground surface.

Associated with and part of the support structure is the height adjustment mechanism. The height adjustment mechanism includes a pivot bar with a radially extending operating handle and a pair of spaced radially extending arms jointed by an engagement bar at the distal ends thereof. The deck includes hook members that are sized and positioned to engage the engagement bar when the deck is positioned in a non raised position as the pivot bar is rotated by the handle so as to first be captured and then raised. As the deck raises, the parallelogram formed by the support arms keeps the deck level. A pin is used with a blocking arm to keep the deck from inadvertently becoming disengaged from the engagement bar.

When in the non raised and non engaged position, the deck can be pulled forward on the support arms and thus the front can be raised to an access configuration by extending the rear support arms to an almost linear configuration. The process is reversed to return to a non raised configuration, rejoined with the height adjustment mechanism after which the deck is in the mowing configuration.

Unlike mowers that normally have a main drive belt and a secondary drive belt that actually turns cutting blades, the drive belt of the mower of this application is a unitary single belt that is reeved to engage the motor as well as pulleys driving each of the cutting blades. A tension release mechanism is provided to release tension from the belt to allow the belt to be removed from a motor pulley and thereby allow the mower deck to be raised to the access configuration thereof.

A fine tuning level adjustment is also provided with each of the support front legs which allows fine adjustment of the alignment of the mower deck to adjust level that may be required because of variations due to construction variations, damage, or because an operator wants to have the front slightly higher than the rear to better attack grass being cut. The level adjustment includes a clevis that is pivotally joined to each the front leg and which is adjustable from front to rear relative to the mowing deck.

OBJECTS AND ADVANTAGES OF THE INVENTION

Therefore, the objects of the present invention are: to provide a midmount mower having a support structure that maintains the deck generally horizontal to the ground during mowing, but allows the deck to be swung easily to an access configuration for repair or maintenance; to provide such a mower deck having a parallelogram leg configuration to allow the deck to maintain a generally horizontal position at any cutting height during mowing and wherein a rear leg can be extended to allow the deck to easily swing from the mowing configuration to the access configuration; to provide such a mower deck wherein converting from the mowing configuration to the access configuration requires minimal manipulation of controls or apparatus; to provide such a mower with a support structure that extends to an over center configuration, so that when the deck is raised to the access configuration, the configuration is stable; to provide such a mower having a height adjustment mechanism that operates in conjunction with the support structure to allow the mower deck to be easily converted from the access configuration to the mowing configuration, allows for height of cutting adjustment and helps support the rear of the mower deck all under the control of a single adjustment lever by the operator; to provide a plurality of cutter blade pulleys and guide pulleys that are connected by a single belt to a motor pulley, so that a single tension pulley can release tension from the entire system to allow disengagement of the belt; to provide a fine height-adjustment mechanism to allow the front of the deck to be adjusted in both height and angle to accommodate the particular deck and desires of the user; to provide such a mower having a height adjustment mechanism with a rod that can be captured by deck hook by simple movement of the height adjustment lever; to provide such a mower having a mower deck that can be positioned forward of the remainder of the mower for ease of access and simplicity; to provide such a mower that is easy to use, relatively inexpensive to make because of simpler mechanisms and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and fragmentary side elevational view of the mower with mower deck in a mowing configuration.

FIG. 4 is a side elevational view of the mower with the mower deck in a mowing and lowered configuration and just prior to rear disengagement of the mower deck from remainder of the mower to allow flip up of the mower deck.

FIG. 5 is an enlarged and fragmentary side elevational view illustrating the mower deck in a lowered configuration and showing the supporting mechanism for the mowing deck in a captured configuration in solid lines and in a release configuration in dash lines.

DETAILED DESCRIPTION OF THE INVENTION

Figure 1:
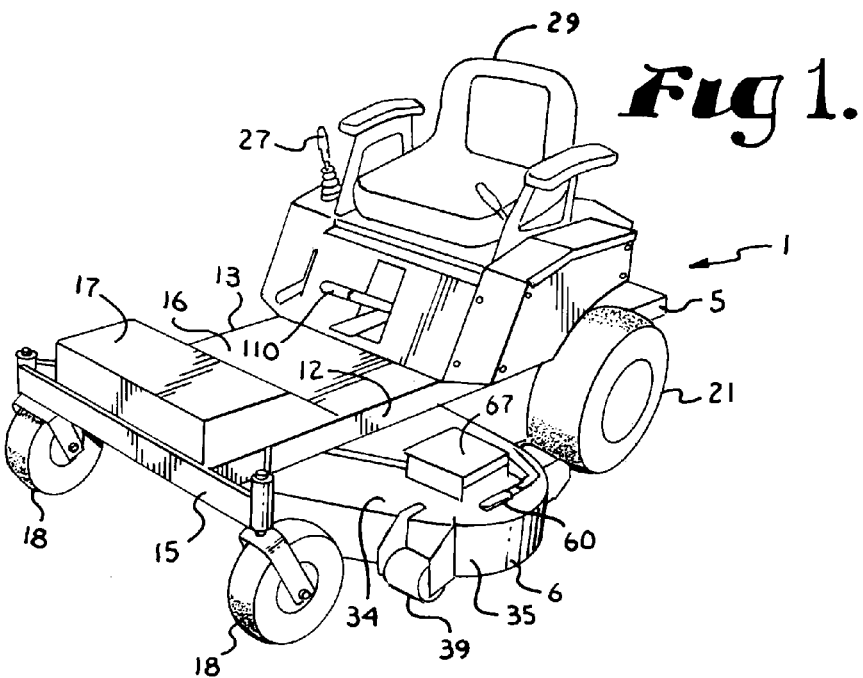
FIG. 1 is a perspective view of a lower heavy mowing deck and a suspension apparatus for the deck in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a mower incorporating improvements in accordance with the present invention. The mower 1 includes a mobile frame 5, a mower deck 6 and a support and adjustment structure or mechanism 7 for joining the mower deck 6 to the frame 5.

The frame 5 includes a pair of generally parallel, laterally spaced and longitudinally extending tubes or channels 12 and 13 that are sized shaped and positioned to be generally parallel to the ground when the mower 1 is operating as a mower and cutting grass and the like. The channels 12 and 13 are spaced by transverse members, such as front transverse member 15 and by plating such as floor plating 16 and forward cowling 17, so as to form an overall solid structure to support the mower deck 6, as described below.

The mobile frame 5 also includes a pair of front castor wheels 18 and a pair of rear drive wheels 21. The mower 1 of the present invention is a mid mount or underbelly type mower wherein all or substantially almost all of both the mower deck 6 and support and adjustment mechanism 7 is located from front to rear between the front wheels 18 and the rear wheels 21 wherein the mower 1 is being utilized to cut grass, as is seen in the illustrations shown in FIGS. 1 and 2.

Mounted on the rear of the frame 5 is a motor assembly 25 which operably provides power to the drive and operate the mower 1 through well known hydraulic wheel drivers driven by a belt and a power pulley (not shown) by the motor assembly 25. The motor assembly 25 also has a lower powered drive pulley 26 which operably powers cutting blades on the mower deck 6, as will be discussed below. The mower 1 of the illustrated embodiment happens to be a zero radius turning mower in which each of the rear wheels 21 and 22 is driven by an independent hydraulic motor (not shown) which is in turn driven by the motor assembly 25. A joystick 27 is mounted on the frame 5 and is located so as to be accessible by the operator to allow the operator to selectively control drive to each of the rear wheels 21, thus controlling the direction and speed of the mower 1. Mowers of the same general type are well known in the industry. While the mower 1 of the present invention happens to be a zero radius turning type mower and has hydraulic units associated with the wheels, it is foreseen that other types of mowers could readily be used in conjunction with the present invention.

The mobile frame 5 also includes an operator seat 29 which allows an operator to be seated during operation of the mower 1 and to control the mower 1 via the joystick 27.

The mower deck 6 has a top wall 34 and a peripheral side wall 35 that depends from the top wall 34 except in the area of a chute (not shown) for allowing discharge grass therefrom. A middle front roller 38 and a pair of side front rollers 39 are mounted on the front or to the left of the mower deck 6. A pair of rear side rollers 41 are mounted on the rear of the mower deck 6. The rollers 38, 39 and 41 keep the deck 6 somewhat spaced from a ground surface that the deck 6 is traversing and helps prevent scalping of the grass whenever the deck 6 gets too close to the ground due to uneven terrain.

Figure 8:
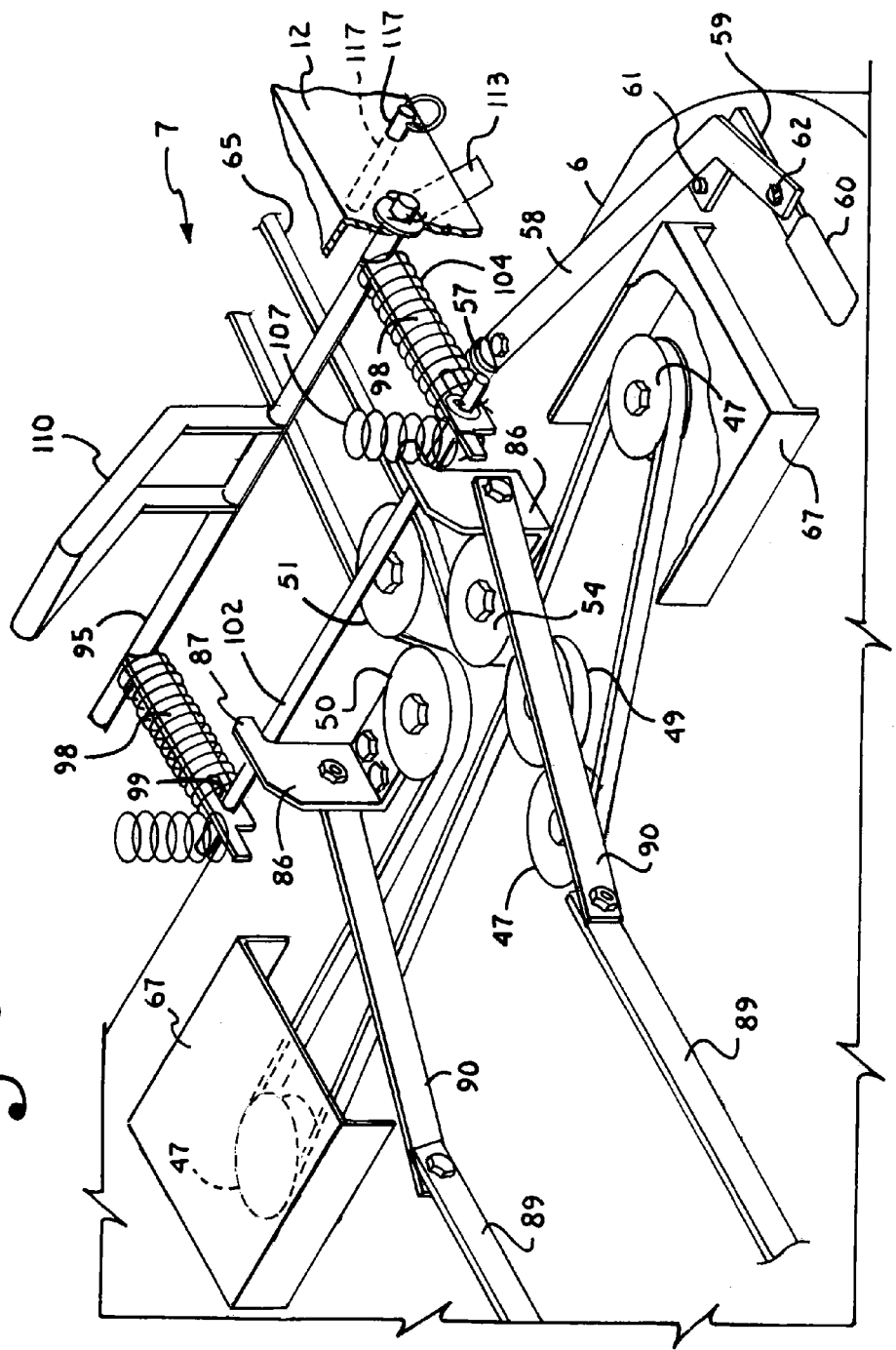
FIG. 8 is a greatly enlarged and fragmentary perspective view of a top of the mower deck and the support mechanism and adjustment devices for use in conjunction with the mower deck.
Figure 10:
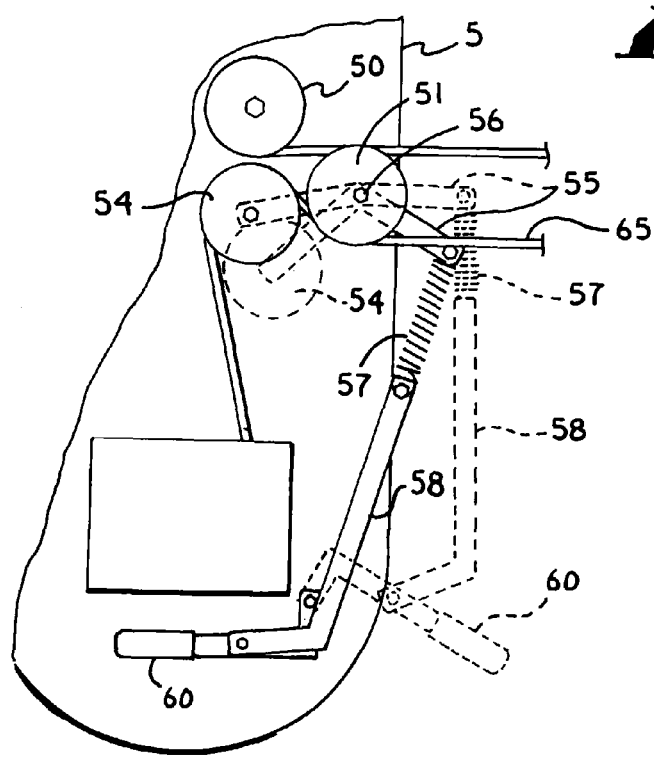
FIG. 10 is a fragmentary and enlarged bottom plan view of a portion of the mower deck showing an operator handle in a first tensioning position in solid lines and in a relaxed position in phantom lines.

Three cutting blades 44 are mounted on the underside of the mower deck 6 in a spaced relationship with one another and so that their cutting patterns overlap from front to rear in a manner that is well known in the art. Each of the cutting blades 44 is rotatably mounted on a shaft 45 which is in turn mounted on the deck top wall 34 and driven by a blade pulley 47. As shown in FIG. 8, also rotatably mounted on top of the deck top wall 34 are three guide pulleys 49, 50 and 51. A tension control pulley 54 is also mounted on the deck top wall 34 and is moveable along a path to selectively reduce or increase belt tension, as described below. As seen in FIG. 10, tension control pulley 54 is attached to a V-shaped lever arm 55 which is centrally pivoted about a pivot 56 located beneath the center of the pulley 51. The lever arm 55 is in turn attached to a spring 57 that is in turn connected to a second V-shaped lever arm 58 which is in turn connected to an L-shaped lever arm 59 extending to an operator handle 60 and a fixed pivot 61 opposite the operator handle 60 so as to allow an operator to swing the lever arm 59 about the pivot 61 thereby also swinging the lever arm 58 about a pivot 62 whereat it is joined with the lever arm 59 so as to selectively position the tension control pulley 54. Tension applying and tension releasing positions for the pulley 54 and associated mechanism are shown in FIG. 10 in solid and phantom lines respectively.

A drive belt 65 is reeved or looped about each of the pulleys 47, 49, 50, 51, 54 and the engine drive pulley 26 so as to provide drive power between the engine and the blade pulleys 47 so as to rotate the blades 44 when desired and when the tensioning pulley 54 is providing tension to the drive belt 65. The drive belt 65 traverses a path that is generally planar except for slight variations due to raising or lowering of the mower deck 6. In particular, the tensioning pulley 54 provides tension to the belt 65 when the operator handle 60 is in a first configuration thereof, as is shown in solid lines in FIG. 10. The operator handle 60 can be selectively moved to a second configuration, wherein the tensioning pulley 54 moves to the location shown by phantom lines in FIG. 10 and which removes tension from the drive belt 65 and allows the drive belt 65 to be easily disconnected from the engine drive pulley 26 for manipulation from the mower deck 6, as described below.

A pair of shields 67 are also mounted on the mower deck top wall 34 in covering relationship to the outside blade pulleys 47 so as to reduce the possibility of an operator inadvertently getting caught between the drive belt 65 and the pulleys 47.

The support adjustment structure 7 supports the mower deck 6 relative on the mobile frame 5, allows selective adjustment of the cutting height of the mower deck 6 during operation and provides for selective positioning of the mower deck 6 relative to the mobile frame 5 for purposes other than cutting of grass. The support and adjustment structure 7 includes a pair of front support arms 75 and a pair of rear support arms 76 and a height adjustment and release mechanism 79.

One of the pair of front support arms 75 is positioned on each side of the frame 5 and pivotally attached to an ear 82 within a respective channel 12 and 13. The lower part of each front support arm 75 is pivotally attached by a connector assembly 83 that is secured to the mower deck top wall 34. One of the pair of rear support arms 76 is located on opposite sides of the mobile frame 5 and are pivotally attached at an upper end thereof to respective ears 82 and at a lower end thereof to respective ears 86 mounted near the rear end of the deck top wall 34. Each of the ears 86 has a rearwardly extending hook member 87 near the top thereof.

Figure 2:
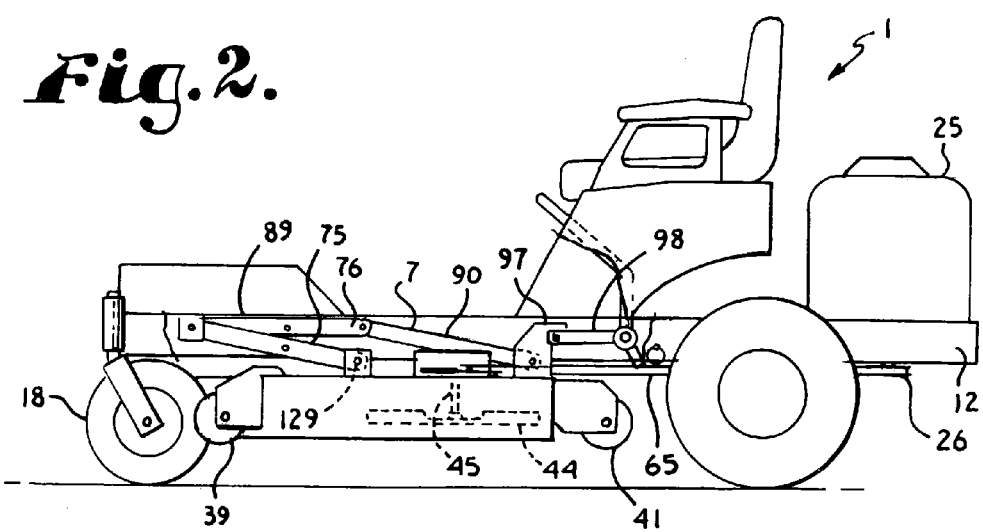
FIG. 2 is a side elevational view of the mower illustrating the mowing deck in a mowing and raised configuration.

Each of the rear support arms 76 has an upper section or portion 89 and a lower section or portion 90 which are joined at a pivot 91. The rear support arm lower portions 90 are essentially the same length as the front support arms 75 and the rear support arm upper portions 89 are essentially the same length as the distance between the locations whereat the front support arms 75 join connector assemblies 83 and the rear support arms 76 join ears 86. In this manner, a parallelogram-like structure is generally formed in conjunction with the arms 75, 76 and that portion of the deck top wall 34 that extends therebetween. However, the dimensions of the parallelogram-like structure can be varied somewhat as noted below. The rear support arm upper portion 89 is joined to the frame 5 only at the ear 82; however, each rear support arm upper portion 89 is designed to abut against the under surface of respective channels 12 and 13, as is seen in FIG. 2 during operation of the mower 1 during the cutting of grass or the like. In this manner, the mower deck 6 can swing about the front support arm 75 and rear support arm lower portion 90, while being maintained in a generally parallel configuration with the frame channels 12 and 13.

Figure 6:
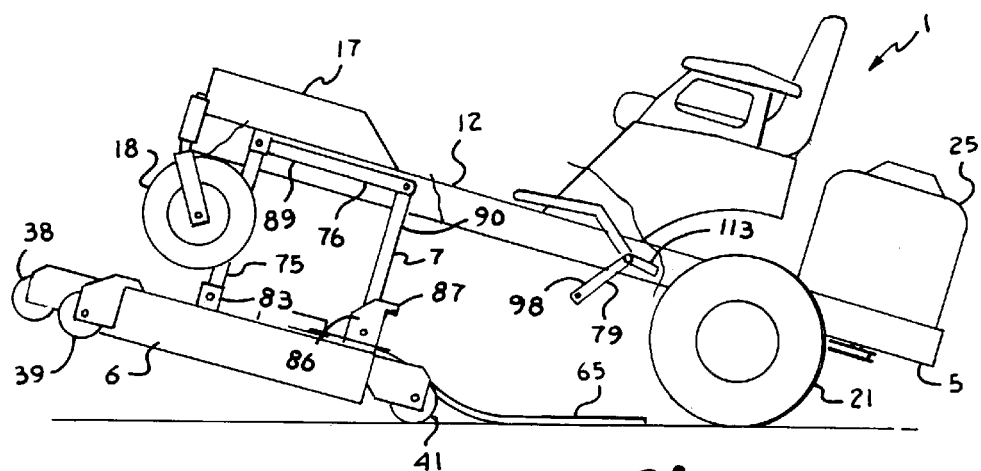
FIG. 6 is a side elevational view of the mower showing the mowing deck at a mid position between conversion from the mowing configuration to an access configuration.

Furthermore, when the mower deck 6 is detached from the height adjustment and release mechanism 79, as will be discussed below, the frame 5 can be raised at the front thereof and the mower deck 6 can be swung downwardly and forwardly relative to the remainder of the frame 5, as is seen in FIG. 6 until the front support arm 75 and the rear support arm lower portions 90 become generally perpendicular to the frame channels 12 and 13. Thereafter, the mower deck 6 can be swung still more forwardly near the rear thereof so as to rotate the rear arm upper portions 89 away from the channels 12 and 13, as is seen in FIG. 7 so as to expose the underside of the mower deck 6 to an operator to allow the operator to work on the mower cutting blades 44, to clean the underside of the mower deck 6 or otherwise perform maintenance on the structure.

In certain embodiments, it is foreseen that a pin, hook or other structure could be equivalently provided on the front support arm 75 or the rear support arm upper portion 89 to engage the opposite in such a way as to hold the upper portion 89 in a parallel configuration relative to the top of the deck 6 and in this way preform the same function as the engagement of the upper portion 89 with the frame 5 that is shown in the illustrated embodiment.

Figure 7:
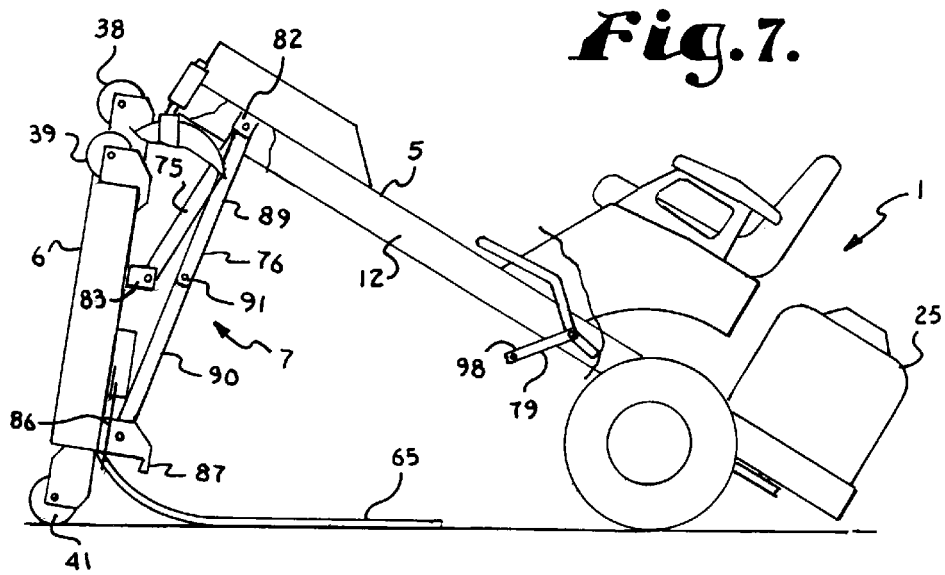
FIG. 7 is a side elevational view of the mower showing the mower deck in the access configuration thereof.

The mower deck 6 preferably has a slightly over-center configuration when in the exposed configuration, as is also seen in FIG. 7 wherein the rear support arms 76 are stretched outwardly and substantially in line relative to one another and the original rear, now bottom, of the mower deck 6 is slightly forward of the original front, now top, thereof, so as to form a stable exposed configuration to allow an operator to work on the device without easy collapse thereof.

With reference to FIG. 8, the height adjustment and release mechanism 79 includes an elongate and laterally extending pivot rod 95 laterally mounted on and extending outwardly therefrom. Near opposite ends of the rod 95 are a pair of rigidly joined lever arms 98. The lever arms 98 that each have an elongate slot 99 near the distal end thereof through which a capture rod or bail 102 is mounted so as to extend generally parallel to the rod 95. A spring 104 is sleeved on each of the lever arms 98 and extends between the rod 95 and the rod 102 so as to urge the rod 102 outwardly relative within the slots 99. A second spring 107 is mounted between each of the distal ends of the lever arms 98 and the frame floor plating 16 so as to cushion movement of the mechanism 79 at the capture rod 102.

Medially extending outwardly from the rod 95 between the lever arms 98 is an operator handle or arm 110 that is fixably attached to the rod 95 and rigidly extending therefrom above the frame floor plating 16 and in the region where the operator can access the handle 110 while in the seat 29. A stop lever arm 113 also extends rigidly outward from the rod 95 near the channel 12. The stop lever arm 113 is positioned so that swinging of the lever arm 113 by rotation of the rod 95 moves the lever arm 113 into abutting engagement with a stop pin 116 selectively located in receiver 117. In this manner the rotation of the rod 95 is limited when the pin 116 is in the receiver 117 and the rod 95 free to rotate further when the pin 116 is removed from the receiver 117. It is foreseen that in some embodiments the stop operably provided by the arm 113 engaging the pin 116 could be provided by other types of devices. For example, a slide, rotatable plate or the like could be operably placed under the handle 110 so as to engage the handle upon downward movement and wherein such device could be moved manually to allow an operator to further lower the handle 110.

Figure 9:
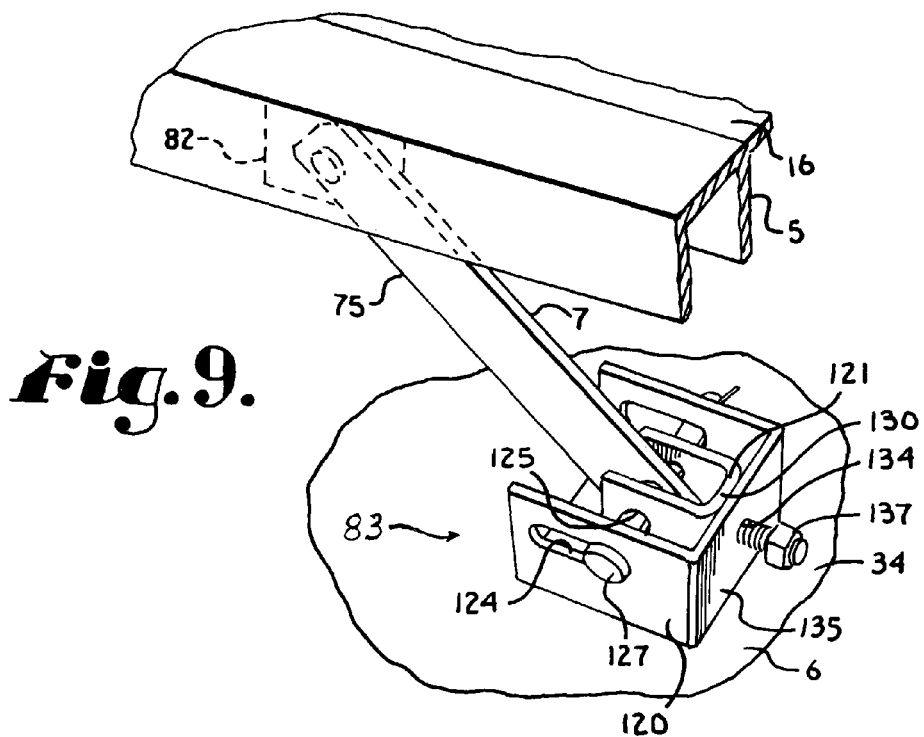
FIG. 9 is a fragmentary and enlarged perspective view of a portion of the mower deck and remaining mower with a frontward support and adjustment mechanism thereof.

Each connector assembly 83, as is best seen in FIG. 9 comprises an outer U-shaped member 120 and an inner U-shaped member 121. The outer member 120 is fixedly attached by welding or the like to the mower deck top wall 34 and includes a pair of longitudinally extending slots 124 in each forward arm thereof. The inner U-shaped member 121 is slideable relative to the outer member 120 and each forward wall includes aligned bores 125 that also align with the slots 124 and receive a pin 127. The bottom end of a respective arm 75 is positioned to be surrounded by the inner member 121 and has a bore 129 that also receives the pin 127. A rear wall 130 of the inner member 121 also has attached thereto a bolt 132 that extends rearwardly and passes through a bore 134 in a rear wall 135 of the outer member 120. A nut 137 allows adjustment of the position of the bolt 132 to slide the inner member 121 relative to the outer member 120 and thereby vary the angle of the front arms 75. This allows height of the front sides of the mower deck 6 to be adjusted slightly, if some irregularity exists or to even raise the mower deck 6 front slightly relative to the rear thereof for certain cutting operations. It is foreseen that in some embodiments, a connector assembly 83 may be used to connect each of the rear support arms 76 to the deck 6 or, where the top of the arms 75 and 76 are independently joined to the frame 5, then a connector assembly 83 could be utilized to connect either support arm 75 or 76 to the frame 5.

During use, the height adjustment and release mechanism 79 functions in the following way. When the pin 116 is located in the receiver 117, the movement of the operator handle 110 rotates the rod 95 and swings the capture rod 102 about through a similar angle of rotation as is incurred by the operator handle 110 so as to move the mower deck 6 upwardly or downwardly as desired by the operator to adjust the cutting height of the mower deck 6. Once the pin 116 is removed from the receiver 117, the operator handle 110 can rotate the rod 95 so that the capture rod 102 moves rearwardly and downwardly and disengages from the hook members 87. This frees the mowing deck 6 from the adjustment and release mechanism 79. Further operation of the operator handle 60 associated with the tensioning pulley 54 releases tension on the tensioning pulley 54 so that the drive belt 65 can be released from the motor drive pulley 26 and thereby allow the mower deck 6 to be swung through the position shown in FIGS. 6 and 7 to allow the mower deck to move from a mowing configuration thereof as seen in FIG. 2 to a maintenance configuration thereof, as seen in FIG. 7. The processes reverse to move the mower deck 6 back into the mowing configuration thereof and the operator handle 60 is rotated again so that the capture rod 102 comes into engagement and is captured on the hook members 87 and thereafter for the rotation of the operator handle 60 raises the mowing deck 6 to a desired cutting level thereof.

It is to be understood that while certain forms of the present invention have been illustrated and described herein, it is not to be limited to the specific forms or arrangement of parts described and shown.

What is claimed is:

1. An underbelly mower adapted to traverse ground comprising:
   a) a frame having at least one front wheel and at least one rear wheel and adapted to traverse ground in a mowing configuration;
   b) a mowing deck that is primarily located between said front wheel and rear wheels; and
   c) a support structure for mounting said deck relative to said frame; said mounting structure including a first forward arm and a second rearward lengthwise bifurcated arm; said bifurcated arm having a first section that is pivotally mounted on said frame and positioned so that said first section is constrained against movement relative to said frame by abutment of said first section against said frame when in said mowing configuration; said bifurcated arm having a second section pivotally connected between said first section and said deck; said first section being swingable relative to said frame so as to not abut against said frame, during transformation of said deck from said mowing configuration to an access configuration thereof and said bifurcated arm enabling said mowing deck to swing forward so as to allow said deck to move between said access and said mowing configuration by swinging of said arms relative to said frame.

2. The mower according to claim 1 wherein:
   a) said support structure arms in conjunction with a portion of said deck between whereat said arms connect to said deck form a generally parallelogram configuration for operably maintaining said deck in a desired configuration relative to ground being traversed by the mower at various cutting heights, when in said mowing configuration.

3. The mower according to claim 1 including:
   a) a height-adjustment mechanism cooperating with said support structure; said height-adjustment mechanism including a first member of a hook and a hook capture device suspended from said frame and a second member of said hook and said hook capture device mounted on said deck; said first and second members being selectively engageable to support a rearward portion of said deck so as to place said mower in said mowing configuration and disengageable so as to allow said deck rear to be swung downward and forward to the access configuration thereof.

4. The mower according to claim 3 wherein:
   a) said height-adjustment mechanism includes a pivot rod mounted on said frame and having an operator control arm extending radially therefrom;
   b) said first member of said hook and hook capture device being mounted on and radially spaced outward from an axis of rotation of said pivot rod so as to allow an operator to control cutting height by rotating said rod between various cutting height positions; and
   c) said first member also disengaging from said second member when swung downwardly and rearwardly into a non mowing configuration.

5. The mower according to claim 4 wherein:
   a) said first member comprises a bar mounted on spacing arms extending radially outward from said pivot rod and said second member comprises at least one hook mounted near a rearward portion of said deck.

6. The mower according to claim 5 wherein:
   a) said pivot rod is blocked from movement to said non mowing configuration by a manually disengageable stop when the stop is engaged.

7. The mower according to claim 6 wherein said stop is a pin and further wherein:
   a) disengagement of said pin operably releases the pivot rod to allow the pivot rod to be rotatable by said operator control arm so as to rotate to the non mowing configuration and so that the first member disengages from said second member for converting the deck from said mowing configuration to said non mowing configuration.

8. The mower according to claim 1 including:
a) a fine height adjustment mechanism associated with at least one of said first and second arms.

9. In a mower adapted to traverse ground having a mobile frame, an underbelly mowing deck and a support structure for supporting said deck relative to said frame and including a height adjustment mechanism; the improvement comprising:
a) said height adjust mechanism having a transversely extending pivot rod that is pivotly secured to said frame;
b) a control handle attached to said pivot rod and operably adapted to allow an operator to pivot said pivot rod;
c) at least one rigid spacing arm extending radially outward from said pivot rod;
d) a first member of a hook and loop device mounted directly on said spacing arm in spaced relationship to said pivot rod;
e) a second member of said hook and loop device mounted near a rear of said deck; said first and second member being sized and shaped so as to operably engage one another as said pivot rod is rotated in a first direction to raise said first member into engagement with said second member and thereafter control a cutting height of said deck above ground; and as said pivot rod is rotated in a second direction opposite to said first direction, said first member lowers said deck until a preselected point is reached after which said first member disengages from said second member; and
f) said rear support arm has first and second sections; said first section being pivotally attached to said frame near said front support arm and constrained against movement against said frame by direct abutment when said mower is in said mowing configuration, but pivoting away from said frame to allow said deck to be rotated to said access configuration; said front support arm and said rear support arm forming a generally parallelogram configuration with a portion of said deck located between where at said front and rear support arms pivotally engage said deck for operably maintaining said deck in a desired configuration relative to the ground being traversed by the mower at various cutting heights, when in the mowing configuration.

10. A mower according to claim 9 wherein:
a) said first member is a bail spaced from said pivot rod and said second member is a hook secured to a rearward portion of said deck.

11. The mower according to claim 9 including:
a) a position stop that operably prevents said pivot rod from rotating to a point of release wherein said first member disengages from said second member until said stop is operably disengaged.

12. The mower according to claim 9 wherein:
a) said pivot rod includes a radially extending stop arm and said position stop includes a pin that is engaged by said stop arm to prevent rotation of said pivot rod to said point of release while in a stop configuration and said pin being operably removable in a non stop configuration to allow transition of said deck from a mowing configuration thereof to an access configuration thereof.

13. The mower according to claim 9 wherein:
a) said support structure includes at least one front support arm and at least one rear support arm extending between and pivotally connecting said deck and said frame.

14. The mower according to claim 9 wherein:
a) said front support arm includes a pair of laterally spaced leg portions; each of said leg portions being pivotally connected to said deck by a fine length adjustment mechanism.

15. The mower according to claim 13 wherein:
a) said front and rear support arms are pivotally connected to said frame so as to be rotatable generally coaxial with respect to one another.

* * * * *